(12) United States Patent
Burlot (10) Patent No.: US 7,810,764 B2
(45) Date of Patent: Oct. 12, 2010

(54) DEVICE FOR GUIDING A FLEXIBLE HOSE AND ROBOT WITH THE DEVICE

(75) Inventor: Claude Burlot, Bullion (FR)

(73) Assignee: Leoni Elocab GmbH, Georgensgmund (DE)

( * ) Notice: Subject to any disclaimer, the term of this patent is extended or adjusted under 35 U.S.C. 154(b) by 935 days.

(21) Appl. No.: 11/639,838

(22) Filed: Dec. 15, 2006

(65) Prior Publication Data

US 2007/0158504 A1 Jul. 12, 2007

Related U.S. Application Data (63) Continuation of application No. PCT/EP2004/014130, filed on Dec. 11, 2004.

(30) Foreign Application Priority Data

Jun. 15, 2004 (DE) ........................ 10 2004 028 577

(51) Int. Cl.
| | |
|---|---|
| A62C 13/76 | (2006.01) |
| A62C 37/50 | (2006.01) |
| F16L 3/08 | (2006.01) |
| F16L 3/12 | (2006.01) |
| F16L 3/22 | (2006.01) |
| A47B 96/06 | (2006.01) |
| E04G 5/06 | (2006.01) |
| F16M 13/00 | (2006.01) |

(52) U.S. Cl. ...................... 248/75; 248/79; 248/74.1; 248/74.2; 248/231.51; 248/68.1; 248/420; 242/397.2

(58) Field of Classification Search .................... 248/75, 248/52, 51, 49, 79, 53, 74.1, 74.2, 74.4, 231.51, 248/230.4, 316.5, 903, 80, 127, 157, 404, 248/55, 397.2, 420–422, 65, 73; 74/490.02; 414/8; 134/21; 384/49; 242/397.2

See application file for complete search history.

(56) References Cited

U.S. PATENT DOCUMENTS 5,108,253 A * 4/1992 Kobayashi et al. .......... 414/694
5,390,876 A * 2/1995 Hatano et al. ................. 248/73

(Continued)

FOREIGN PATENT DOCUMENTS

DE 201 13 742 U1 12/2001

(Continued)

*Primary Examiner*—J. Allen Shriver, II
*Assistant Examiner*—Christopher Garft
(74) *Attorney, Agent, or Firm*—Laurence A Greenberg; Werner H Stemer; Ralph E Locher (57) ABSTRACT

A device for guiding a hose of an industrial robot, having at least one supply line, with a guide element wherein the hose can move against the restoring force of a restoring element. The guide element has an axial guide segment for guiding the hose in its longitudinal direction and a compensation segment adjoining the guide segment. The compensation segment is formed by a housing configured such that a lateral deflection of the supply line—in relation to the longitudinal direction—is made possible in the housing across an axial section. The guide element is formed so that it can swing open. At the entry side into the guide element the hose is surrounded by an abutment for the restoring element. The abutment may be inserted in the guide element or mounted in a fastening clamp block.

20 Claims, 6 Drawing Sheets

U.S. PATENT DOCUMENTS

| | | | |
|---|---|---|---|
| 6,217,375 B1 | 4/2001 | Nagai et al. | |
| 6,288,512 B1 * | 9/2001 | Berninger et al. | 318/568.1 |
| 6,293,504 B1 * | 9/2001 | Hartmann | 248/74.1 |
| 6,601,877 B2 * | 8/2003 | Nishikawa et al. | 285/62 |
| 6,644,602 B1 * | 11/2003 | Lundstrom et al. | 248/51 |
| 6,811,124 B2 * | 11/2004 | Karlinger | 248/49 |
| 6,830,225 B2 * | 12/2004 | Kato | 248/49 |
| 2003/0173470 A1 * | 9/2003 | Geiger | 248/55 |
| 2005/0236529 A1 * | 10/2005 | Lembo | 248/75 |

FOREIGN PATENT DOCUMENTS

| | | |
|---|---|---|
| EP | 1 304 195 A1 | 4/2003 |
| JP | 2002-67828 A | 3/2002 |

\* cited by examiner

DEVICE FOR GUIDING A FLEXIBLE HOSE AND ROBOT WITH THE DEVICE

CROSS-REFERENCE TO RELATED APPLICATIONS

This is a continuation, under 35 U.S.C. §120, of copending international application PCT/EP2004/014130, filed Dec. 11, 2004, which designated the United States; this application also claims the priority, under 35 U.S.C. §119, of German patent application DE 10 2004 028 577.2, filed Jun. 15, 2004; the prior applications are herewith incorporated by reference in their entirety.

BACKGROUND OF THE INVENTION

Field of the Invention

The invention relates to a device for guiding a hose, having at least one supply line, especially for guiding a packet of hoses of an industrial robot, with a guide element wherein the hose can move against the restoring force of a restoring element. The invention, furthermore, relates to an industrial robot with such a device.

A device of this general kind is known from U.S. Pat. No. 6,811,124 B2 and its corresponding European published patent application EP 1 369 211 A1 and it is used to ensure the necessary length variability when leading a hose or a hose-shaped supply line to a movable machine part. In particular, the leading of a supply line to a robot hand requires a very good length variability of the supply line, owing to the many degrees of freedom of movement. In particular, the device is designed to ensure a safe leading under high strain due to pressure, tension, twisting and abrasion.

A plurality of supply lines are needed for a robot hand or for a robot tool held by the hand. These are usually led and brought together in a hose, such as a corrugated pipe. The hose with the supply lines is also known as a hose packet and the supply lines are also known as hose components. Electrical energy, control signals or operating media such as water, oil or air must be supplied to the robot hand or the tool. It is known from the above-mentioned U.S. Pat. No. 6,811,124 B2 and EP 1 369 211 A1 how to bundle the supply lines and lead them in a common hose or protective hose. The protective hose is led movably in a channel with continuous longitudinal openings in the sides. Through the side opening, the individual supply lines are brought up to the protective hose. The protective hose itself is supported against the channel by a compression spring which surrounds it. Under tensile stress, the protective hose and the supply lines arranged in it are pulled forward along the channel against the spring force. When the length is shortened due to a corresponding movement of the robot arm, the protective hose and the supply lines are pulled back by the spring force. While the protective hose is being guided in the channel, the supply lines brought up to the protective hose run along the lateral opening.

SUMMARY OF THE INVENTION

It is accordingly an object of the invention to provide a device for guiding a hose and an industrial robot which overcome the above-mentioned disadvantages of the heretofore-known devices and methods of this general type and which provides for a reliable guidance of a hose with longitudinal compensation.

With the foregoing and other objects in view there is provided, in accordance with the invention, a device for guiding a hose of an industrial robot, the hose having at least one supply line. The guide device comprises:

a guide element movably guiding the hose against a restoring force of a restoring element;

the guide element being configured to swing open, and the guide element having an entry side for the hose, an axial guide segment for guiding the hose in a longitudinal direction thereof, and a compensation segment formed by a housing adjoining the guide segment, the compensation segment enabling a lateral deflection of the supply line, in relation to the longitudinal direction, in the housing across an axial section; and an abutment for the restoring element disposed at the entry side and surrounding the hose, the abutment being inserted in the guide element or mounted in a fastening clamp block at the entry side.

In other words, the objects of the invention are achieved with a device that has a guide element wherein the hose is led movably to enable a longitudinal compensation against the restoring force of a restoring element. The guide element has an axial guide segment as well as a compensation segment adjoining the guide segment and formed by a housing. In the axial guide segment, the hose is led in its axial or longitudinal direction, whereas the supply line which may be taken further in the hose is deflected laterally in the compensation segment—in relation to the longitudinal direction. The deflection is made possible by an axial section, which enables a longitudinal compensation, especially between a fixed junction for the supply line and a movable tool on a robot hand, connected via the supply line.

By configuring the guide element from two partial segments, an especially secure and reliable guidance of the hose or the supply line is assured in both the axial and the lateral direction. Especially owing to the guided deflection in the compensation segment, where the longitudinal compensation occurs, a trouble-free and low-wear guidance of the hose is made possible, even in high-stress settings such as an industrial welding robot.

By configuring the compensation segment as a housing, wherein the supply lines are inserted in protected manner, a secure and dirt-free guidance of the supply lines is made possible, even without a protective hose. The supply lines are in particular encapsulated in the housing. The individual supply lines are led inside the housing from/to the axial guide segment. The rear end of the housing, facing away from the axial guide segment, places a limit on the return movement of the hose.

The restoring element as such can be any desired kind, in particular, it can also be electrical or mechanical in configuration. In a mechanical configuration, one end of the restoring element is connected to the guide element, while the other end is mounted on the hose with a force fit. When the hose moves actively in the longitudinal direction, the mechanical restoring element is either stretched or strained.

The mechanical energy stored in this process is utilized to take back the hose when the stress is released.

Advantageously, a spiral spring, especially a metallic one, surrounding the hose, is used as a cheap and effective mechanical restoring element.

The device is suited in principle for guiding any given hose. The hose can be a single supply line. But the hose can also be a protective hose wherein a bundle of supply lines or hose components are assembled together. The device is preferably configured so that it can be used for various kinds of machines, in particular, industrial robots. Therefore, the device is independent of the particular type of industrial robot.

The housing expediently has a rectangular or U-shaped geometry with an end face subtended between the legs of the U, where on the one hand the axial guide segment is joined and on the other hand the supply lines are led into or brought out from the housing. Owing to the configuration with essentially U-shaped cross section, the run of the hose or that of the supply lines leaving the axial guide segment can be favorably influenced, taking into account the desired radius of curvature. The hose or the supply lines emerging from the axial guide segment are led through the U-shaped housing in a 180 degree curve and are then preferably joined via an interface firmly to the onward leading supply lines of a robot or a machine. The interface in this case is usually firmly connected to the robot and has connection adapters, such as hose couplings for fluids or gases or plugs for an electrical connection. The return movements of the hose are compensated via the radius of curvature of the hose components inside the hollow housing. As an alternative to taking the supply lines to the end face for the 180 degree deflection, one can use deflections of 90 degrees or other angles, depending on the desired application and configuration of the housing.

In order to prevent grime from getting in, the end face is expediently closed except for an opening to lead through the supply lines. Preferably, moreover, a component guide is provided in the opening, wherein the individual supply lines are taken, preferably individually, and by which a seal, in particular, is achieved. This prevents welding dust, welding spatter, or other foreign bodies from getting in. The component guide is advantageously configured at the same time as a tension relief element.

Because of the longitudinal compensation, the hose extends at least part way into the compensation segment as well, before the individual supply lines are deflected to the side. In order to prevent an unwanted lateral breaking of the hose here and to ensure a predefined deflection, the hose is taken at least a bit further in the longitudinal direction in the compensation segment in one preferred embodiment. For this, in particular, a guide adapter designed as a guide ring is arranged on the hose and it can slide along an axial guide inside the housing. The latter is expediently configured such that it can be adapted to various hose diameters.

According to one advantageous embodiment, the guide element can swing open, and in particular it is designed in the form of at least two half-shell elements, which can be temporarily joined together. This enables a simple mounting of the supply lines, as well as a fast replacement of hose components. The half-shell elements are preferably easy and quick to open and close by means of snap buckles arranged at the sides. A hinge is preferably arranged opposite the snap buckles.

In regard to the configuration of the axial guide segment, according to a first variant it preferably has several guide rods, between which the hose is led. The guide rods in this case consist preferably of metal or a fiber-reinforced plastic. An inner hose guide space is defined by the at least three guide rods, wherein the hose is securely guided. One special benefit of the configuration with the guide rods is that the effective length of this axial guide segment can vary quite easily in dependence on the particular requirement for the particular robot. In order to adjust the effective length, an abutment able to slide along the rods is preferably provided, especially for a restoring spring of the restoring element. The abutment can be fixed at any desired positions of the guide rods, so that the distance between the compensation segment and this abutment can be varied without problem.

Expediently, the guide rods here are distributed at equal distance in a holding element, i.e., evenly about the circumference. The holding element is configured, in particular, as a holding ring, having circular recesses into which the individual guide rods can snap with form-fit. The rods snapping in from the outside enable an easy assembly and disassembly.

Expediently, the holding element is also configured as the abutment for the restoring element, i.e., it has a dual function.

In order to easily adjust the length of the axial guide segment, the holding element is fastened to a fixed securing part such that it can slide. The fastening part in this case is an assembly part on the robot.

At the end opposite the holding element, the guide rods are advisedly mounted on the compensation segment so that they can slide. For this, in particular, bearing sleeves or bushings are provided in the compensation segment.

For the simplest possible structural configuration, in one preferred embodiment the compensation segment has two hinged half-shell elements, joined together by a hinge element, wherein one of the guide rods forms a hinge pin for the hinge element, i.e., it is part of the hinge element.

In order, furthermore, to enable a simple adaptation to different hose diameters, adapter sleeves are expediently pushed onto the guide rods, having different outer diameters according to the area of application and the diameter of the hose. The adapter sleeves are made of a resistant material, for example, metal or a low-wear plastic. Owing to this measure, only a single type of axial guide element formed by the guide rods is required for the most varied types of robots.

According to an alternative expedient configuration of the axial guide segment, it is designed as a closed segment of round pipe. The segment of round pipe also allows for a continuous adjustment of the installation position in the longitudinal direction. Furthermore, a simple fastening of the guide element to the robot or the machine is possible by means of clips surrounding the segment of round pipe.

In order to guide the guide adapter in the compensation segment, the housing of the compensation segment preferably has a reduced inner height laterally to its partial region aligned with the round pipe segment, so that a guide is formed for the hose inside the housing in the longitudinal direction. In regard to the hinged configuration of the guide element, both the round pipe segment and the compensation segment are preferably formed from two half-shell elements. The mutually corresponding half-shell elements of the round pipe segment and the compensation segment can be formed here as a single-piece element.

Other features which are considered as characteristic for the invention are set forth in the appended claims.

Although the invention is illustrated and described herein as embodied in device for guiding a flexible hose and a correspondingly equipped industrial robot, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Features having the same action are given the same reference numbers in the figures.

DESCRIPTION OF THE PREFERRED EMBODIMENTS

Figure 1:
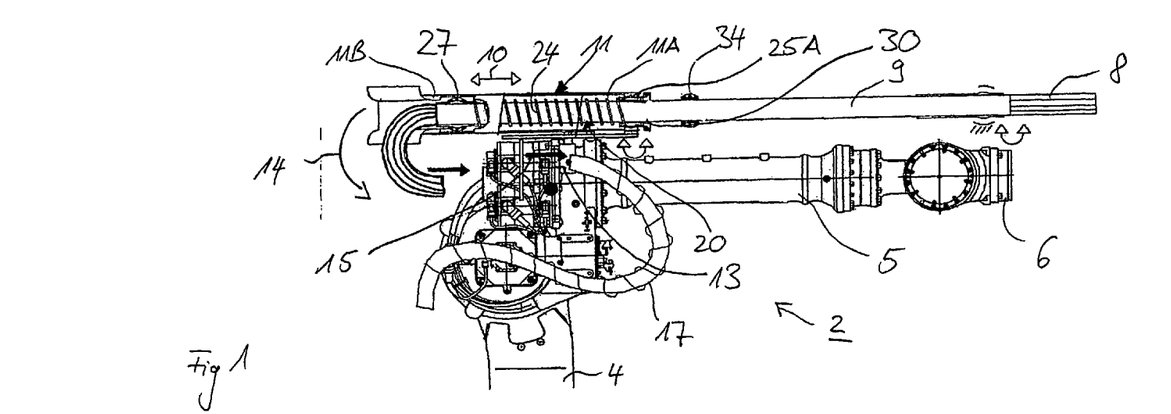
FIG. 1 is a partial side view of a robot with a device, only partly depicted, for guiding supply lines to a robot hand.

Referring now to the figures of the drawing in detail and first, particularly, to FIG. 1 thereof, a robot 2 comprises a link 4, on which a robot arm 5 is pivotably mounted. At the end of the robot arm 5 is arranged a robot hand 6, able to pivot about two axes relative to the robot arm 5. The actual robot tool is arranged on the robot hand 6. It can be, for example, a welding device. The required electrical energy as well as control signals and working fluids, such as welding gas or refrigerant, are fed to the robot tool via supply lines 8. The supply lines 8 are brought together as hose components in a protective hose 9, especially one configured as a corrugated pipe. This is led in a device with a guide element 11. The latter is preferably made of a nonconducting insulating material and consists entirely of plastic.

Since the supply lines 8 have to be firmly connected to the robot tool, a movement of the robot hand 6 results in a longitudinal compensating movement of the supply lines 8 and thus of the protective hose 9. The protective hose 9 moves in the device along its longitudinal direction, either forward or backward. This movement is illustrated by the arrow 10.

The protective hose 9 is movably guided inside the guide element 11 in its longitudinal direction, which corresponds to the direction of the arrow 10.

The guide element 11 comprises an axial guide segment 11A as well as an adjoining deflection or compensation segment 11B. In the exemplary embodiment of FIG. 1, the axial guide segment 11A is configured as a round pipe segment, which is enclosed around its entire circumference over its entire length. Only for better representation of the protective hose 9 guided therein does FIG. 1 show the guide element 11 with the round pipe segment partially broken open. The protective hose 9 passes from the axial guide segment 11A into the compensation segment 11B. In the region of the compensation segment 11B, the supply lines emerge from the protective hose 9 in an arch and are guided away to the side, as indicated by arrow 14. The supply lines 8—shown interrupted in FIG. 1 for better clarity—are coupled by an interface 13 in a manner not depicted in more detail here to lines arranged on the link 4 of the robot 2. These lines, indicated by the arrow 15 and also not depicted in further detail, are flexibly arranged in a guide 17 along the link 4. The flexible guide 17 allows the robot arm 5 to pivot relative to the link 4.

The guide element 11 comprises a mechanical restoring element 20, which allows the protective hose 9 to be moved in and out of the device according to the movement of the robot hand 6 and thus holds the protective hose 9 and the supply lines 8 between the guide element 11 and the robot hand 6 in a desirable tension. In other words, the restoring element 20 enables a variable active length of the protective hose 9. The guide element 11 itself is fixed in position on the robot arm 5 above the pivot axis by means of a fastening element, for example a mounting plate.

The restoring element 20 comprises a metallic spiral spring 24, as well as an internal abutment 25A integrated in the guide element 11 and a guide adapter 27. The internal abutment 25A is fixed in an exit opening 30 of the guide element 11. For this purpose, a thickening of the circumference of the abutment 25A in the manner of a bulge engages in a corresponding groove-like recess in the inner circumference of the guide element 11 (cf. FIG. 8).

Figure 2:
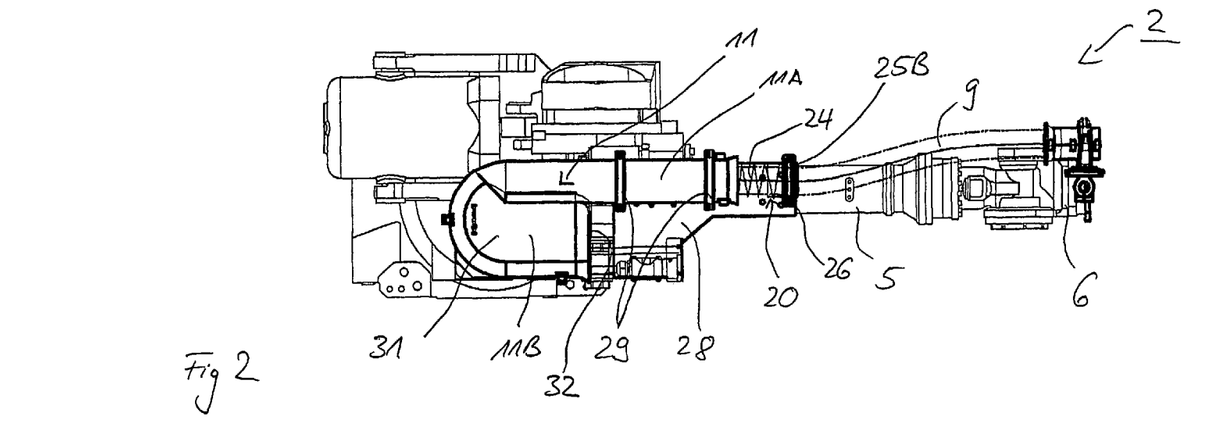
FIG. 2 is a partial top view of a robot with another device arranged on it for guiding supply lines to a robot hand.

In the alternative embodiment of FIG. 2, an external abutment 25B is provided outside the guide element 11, the abutment being supported by a fastening clamping block 26 designed in the manner of a pipe clip. The fastening clamping block 26, in turn, is arranged on a fastening plate 28. Pipe clips 29 are secured thereon, and they grasp the axial guide segment 11A. The fastening of the overall device to the robot 2 occurs preferably via the fastening plate 28 alone. The special design of the guide element 11 shown in FIG. 2 is presented in detail in FIG. 11.

In both embodiments, the spiral spring 24 loosely grasps the protective hose 9 and is joined by friction to the ring-shaped abutment 25A, B. The protective hose 9 itself slides through the abutment 25A, B. The other end of the spiral spring 24 is connected to the likewise ring-shaped guide adapter 27, which is pushed onto the protective hose 9 and firmly joined to the protective hose 9 at the desired mounting position. Thus, the mounting position will dictate the desired spring tension. The outer diameter of the guide adapter 27 is adjusted to the inner diameter of the axial guide segment 11A, as well as its continuation in the compensation segment 11B, so that the guide adapter 27 can slide in the longitudinal direction in the guide element 11. For this sliding movement, the spiral spring 24 has a smaller outer diameter than the inner diameter of the axial guide segment 11A. Using guide adapters 27 with different inner diameters, an easy adjustment is possible for the guidance of hoses with different outer diameters. In similar fashion, the abutment 25A, B can also be adapted.

The arrangement of the external abutment 25B is especially advantageous with regard to adjusting to different outer diameters of different protective hoses 9 without problem. For this purpose, the abutment 25B is adapted in a simple manner to the particular outer diameter. For example, a suitable reducing piece is installed in the fastening clamping block 26, at the same time serving as the abutment 25B.

In order to reliably limit the path of the protective hose 9 during a retraction movement of the spiral spring 24, an end stop 34 is mounted on it.

If the active length of the protective hose 9 increases by virtue of a turning or a forward movement of the robot hand 6, the spiral spring 24 will be compressed in the guide element 11. An opposing force will be created by the spring tension. When the active length is shortened by the robot hand 6 turning or moving back, the spiral spring 24 relaxes and pulls back the protective hose 9 through the exit opening 30.

For a reliable and trouble-free operation, a secure guidance of the supply lines 8 is required from the end of the protective hose 9, located in the region of the guide adapter 27, to the interface 13. Because of the longitudinal movement of the protective hose 9 in the axial direction, it is necessary for the arch-shaped deflection of the supply lines 8 to likewise move along a partial axial segment for the required length compensation. The compensation segment 11B of the guide element 11 is provided to enable a secure and reliable guidance here. For this, the compensation segment 11B is configured as an essentially U-shaped housing 31, at whose end face 32 the axial guide element 11A is joined, on the one hand, while on the other hand the supply lines 8 emerge here. The axial guide element 11A extends in particular for a partial distance into the compensation segment 11B, so as to further assure a secure axial guidance of the protective hose 9 in the region of the partial distance. At the same time, the axial guide inside the compensation segment 11B is configured so that the supply lines can also emerge to the side for the same partial distance and enter the interior of the housing 31.

Different embodiments of the guide element 11 shall now be presented by means of FIG. 3 to 11.

In a first basic embodiment, as is represented by FIG. 3 to 7, the axial guide element 11A comprises three guide rods 33, spaced apart from each other by 120°, and fixed in a ring-shaped holding element 35. For this, the individual guide rods 33 are snapped from the outside into corresponding recesses 36 on the holding element 35 and held in them by form fit, as is especially shown by FIG. 4A. The holding element 35 as a whole is designed as a system holder, which also serves at the same time as an abutment 25A for the spiral spring 24 and has an end stop for this, as shown by FIG. 4B.

Figures 3, 4A, 4B:
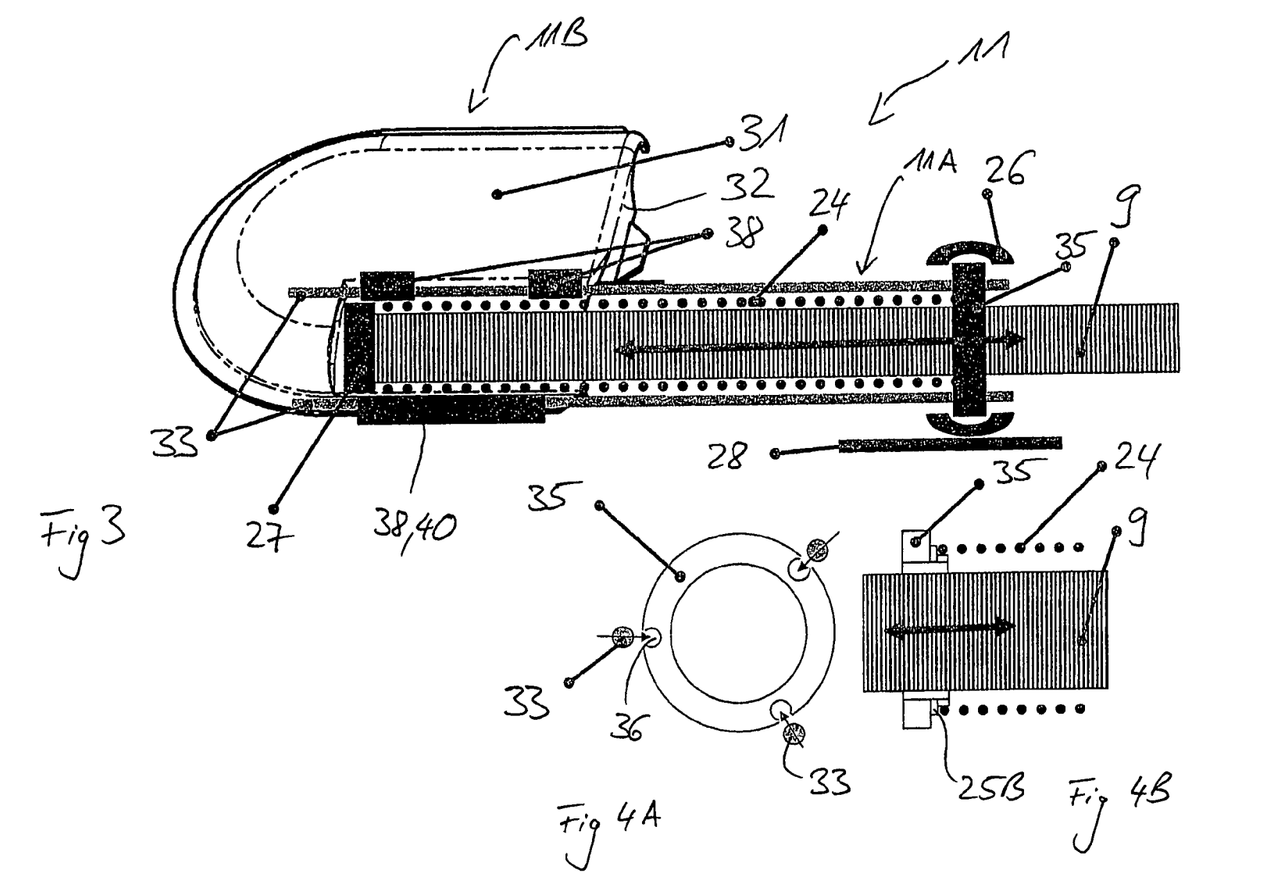
FIG. 3 is a representation of a guide element with an axial guide segment, which has guide rods.
FIG. 4A is a plan view of a holding element, configured as a holding ring, to secure the guide rods.
FIG. 4B is an enlarged cross-sectional view in the region of the holding element, which is configured at the same time as an abutment for a return spring.

The protective hose 9, configured as a corrugated pipe, is led through the holding element 35 and thus in the spaced surrounded by the guide rods 33. At the same time, the spiral spring 24 lies between the guide rods 33 and the protective hose 9 and thrusts against the guide adapter 27. The holding element 35, in turn, is held in the fastening clamping block 26, which can swing open and is designed as a clip; in particular, it is fastened on the mounting or fastening plate 28 and can slide.

The guide rods 33 extend for a partial axial distance into the compensation segment 11B and thus also ensure a secure axial guidance of the protective hose 9 inside the compensation segment 11B. For this, bearing sleeves 38 are provided in the compensation segment 11B, through which bearing sleeves the rods 33 are led. The rods 33 are loosely placed in the bearing sleeves 38, so that an axial mobility is possible for the length compensation.

As an alternative to the rod-like configuration of the guide rods 33 shown in the figure, these rods or at least one of them can also be configured in the manner of a telescoping rod, which at the same time forms the restoring element, i.e., it is provided in particular with a spring element situated on the inside. In this case, one can dispense with the spiral spring 24.

Figures 5, 6:
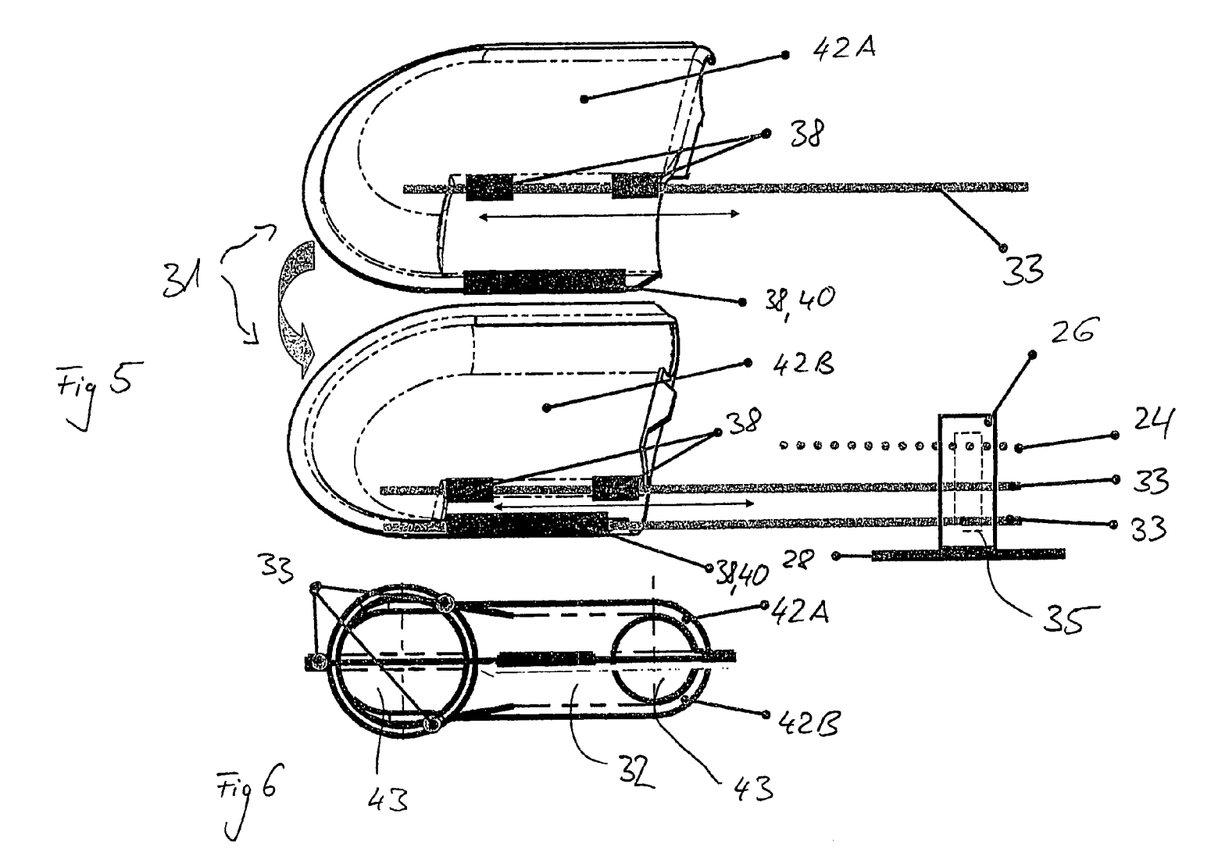
FIG. 5 is an exploded view of the guide element from FIG. 3, with a compensation segment consisting of two half-shell elements.
FIG. 6 is a front view of the end face of the compensation segment of the guide element from FIG. 3 and 5.

The double shell makeup of the compensation segment 11B is especially apparent in FIGS. 5 and 6. Thus, the housing 31 has an upper half-shell element 42A and a lower half-shell element 42B. The two half-shell elements 42A, B are joined together by a hinge. This is formed by respective hinge elements 40 on the two half-shell elements 42A, B, and also by one of the guide rods 33, which forms a kind of hinge pin and is led through the hinge elements 40, acting as bearing sleeves. The two-shell configuration with opening capability via the hinge allows for an especially easy assembly and insertion of the protective hose 9 with the supply lines 8 into the guide element 11. The opening capability also enables an easy replacement of a damaged hose 9 or a faulty supply line 8. The opening capability is assisted on the part of the axial guide element 11A in that the guide rods are merely latched or clipped in the holding element 35, and so they can be removed from the holding element without problem.

As is especially evident from the view looking at the end face 32 of the housing 31 of FIG. 6, the end face 32 is closed in configuration and only has openings 43 for entry of the protective hose 9 (left half of the image) and for the exit of the supply lines 8 (right half of the image). The entry side here is determined by the axial guide element 11A. Due to the at least predominantly enclosed inner space of the housing, the components emerging from the axial guide segment 11A are encapsulated and protected against contamination. As an alternative, the end face can also be completely open. The supply lines 8 are led forward in an arch inside the housing 31 and up to the end face 32. The arch defined by the U-shaped configuration of the housing limits the radius of curvature of the supply lines 8 or the hose. In the region where the axial guide element 11A adjoins it, the housing has a somewhat round diameter in continuation of the axial guide segment 11A, which narrows to the side by the walls of the housing contracting, so that an axial guidance is formed already by the housing geometry for a partial distance in the compensation element 11B. In addition, in the embodiment of FIG. 3 to 7, the axial guidance in the compensation segment 11B is provided by the guide rods 35.

Furthermore, an insert is expediently provided in the opening 43 for the supply lines 8, for individual guiding of the supply lines 8. The insert is configured at the same time as a sealing element, in order to protect the housing 31 from dirt particles getting in, so as to ensure a trouble-free operation.

Figure 7:
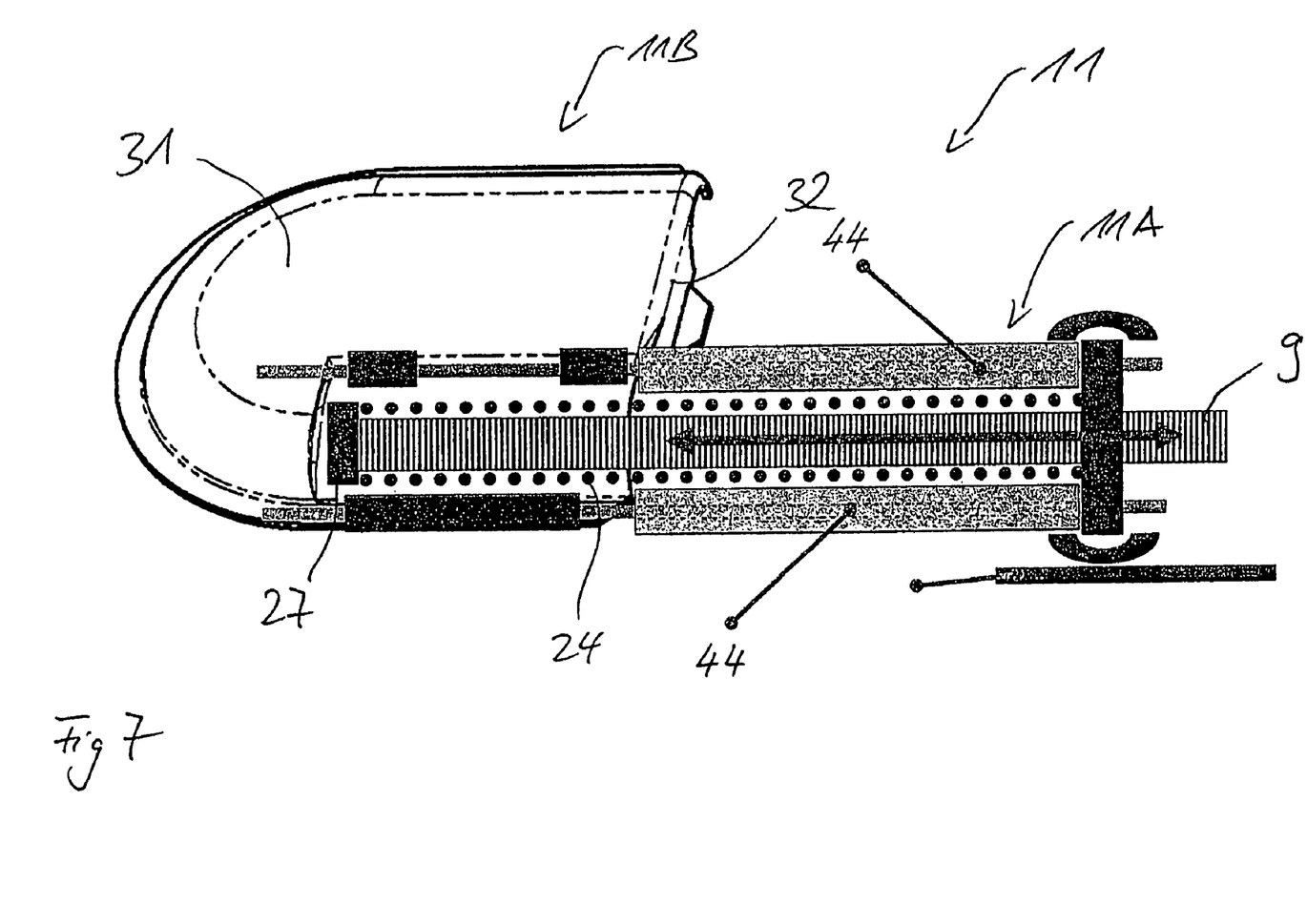
FIG. 7 shows the guide element from FIG. 3 and 5 with adapter sleeves pushed onto the guide rods.

A modification of the embodiment of FIG. 3 or 5, adapter sleeves 44 are placed on the guide rods 33 in the variant of FIG. 7, serving to reduce the free inner diameter of the axial guide element 11A. Thus, the adapter sleeves 44 enable an easy adaptation to different hose diameters, so that the guide element 11 can be used universally for the most varied types of hose and robot. Basically, the adaptation to different hose diameters is possible in various ways. The adapter or fitting elements are, in particular, the guide adapter 27, the abutment 25A, B, with different inner diameters, and also the adapter sleeves 44.

FIGS. 8 to 11 show various versions of a second basic configuration of the guide element 11. In these versions, the axial guide segment 11B is designed as a segment of round pipe closed over at least one partial axial region. This round pipe segment, thanks to the special geometry of the housing 31, is continued somewhat in the axial compensation segment 11B, in order to ensure the axial guidance of the hose 9 also inside the compensation segment 11B for a partial axial distance. At the same time, a sideways deflection of the individual supply lines 8 toward the opening 43 is possible inside this partial axial distance. For this, the inner height of the housing 31 decreases toward its middle.

Figures 8, 9:
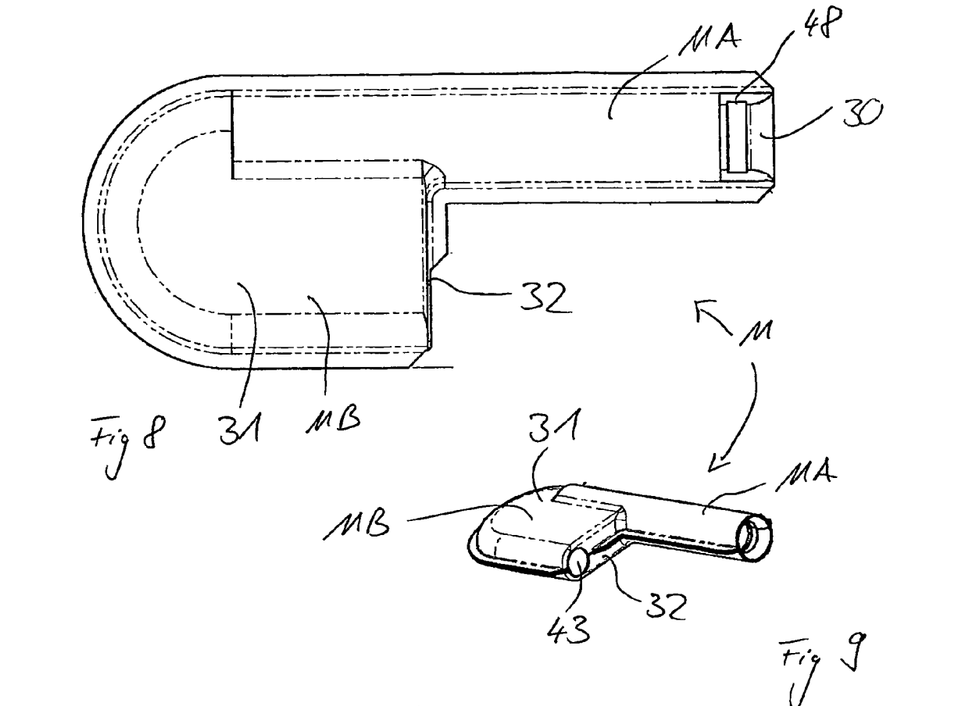
FIG. 8 is a top view of an alternative configuration of the device, wherein the axial compensation segment is configured as a round pipe segment.
FIG. 9 is a perspective view of the device from FIG. 8.
Figure 11:
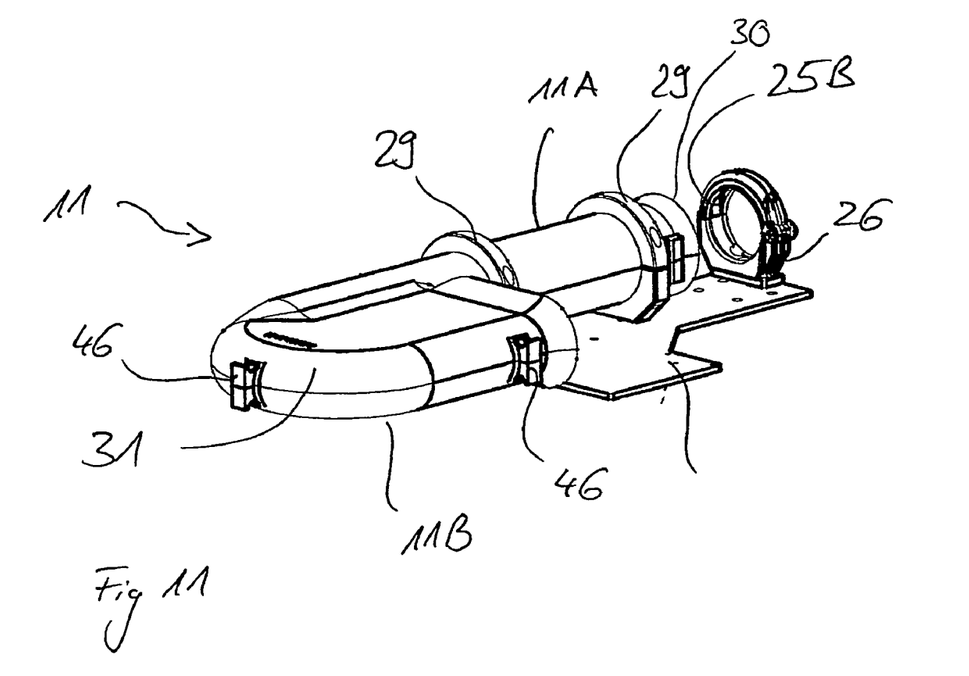
FIG. 11 is a perspective view of an alternative configuration of the device with a fastening clamping block to accommodate an external abutment.

As is especially evident from FIGS. 8 and 11, the exit and entrance openings 43 for the hose 9 and the supply lines 8 from and to the guide element 11 are provided with rounded entrance and exit edges and have a somewhat trumpet-like shape to ensure a gentle insertion and removal of the protective hose 9 and the supply lines 8. In the embodiment of FIG. 8, a groove 48 is made in the exit opening 30, serving to accommodate the internal abutment 25A. Thus, the exit opening 30 is formed by the internal abutment 25A, which is a separately made part, especially a turned part, which is firmly connected to the round pipe segment, especially by welding. A reducing piece can be form-fitted in the groove 48, enabling an adaptation to the respective outer diameter of the protective hose 9.

Figure 10:
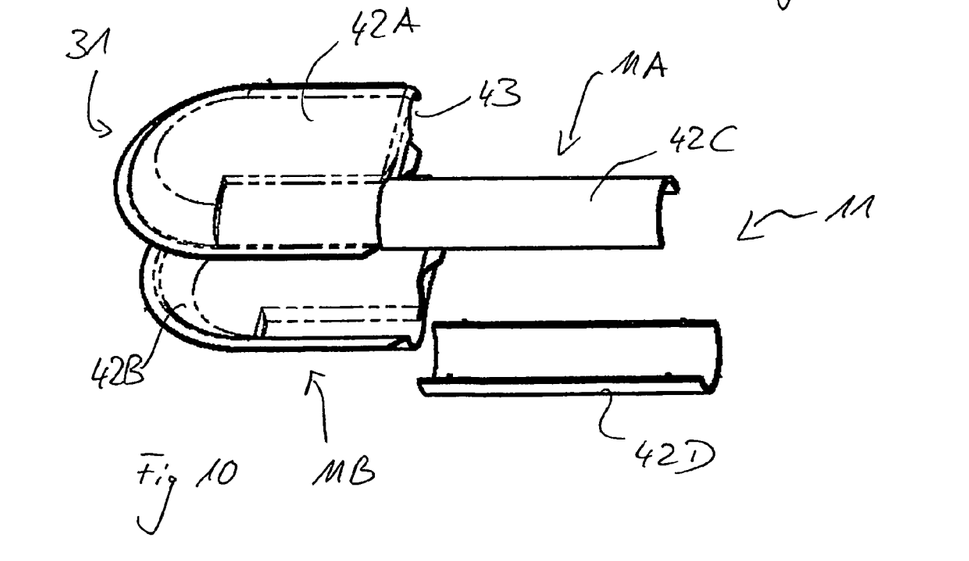
FIG. 10 is a perspective exploded view of a device similar to that of FIGS. 8 and 9.

The guide element 11 is once again made in shell form for an easy assembly, as is especially evident in FIG. 10. Besides the compensation segment 11B, the round pipe segment is also formed from half shells, and in the exemplary embodiment the upper half shell 42A of the compensation segment 11B is designed as a single piece with an upper half shell 42C of the round pipe segment, while a lower half-shell element 42D of the round pipe segment is designed as a separate shell element. The individual shell elements are joined together by snap buckles 46 (see FIG. 11). In FIG. 11, the guide element 11 is secured to the fastening plate 28 by the pipe clips 29. Thanks to the separate half shell 42D, the bottom half shell 42B of the compensation segment 11B can be easily removed without having to detach the guide element 11 from the fastening plate 28 or from the robot. Furthermore, a continuous adjustment of the mounting position is possible by sliding the round pipe segment relative to the pipe clips 29 before the definitive fastening.

As already explained in connection with FIG. 2, wherein the guide element of FIG. 11 is used, the guide element 11 has the external abutment 25B, which is likewise supported on the fastening plate 28 at a distance from the exit opening 30 in the clip-like fastening clamping block 26.

I claim:

1. A device for guiding a hose of an industrial robot, the hose having at least one supply line, the device comprising:
    a restoring element;
    a guide element movably guiding the hose against a restoring force of said restoring element;
    said guide element being configured to swing open, and said guide element having an entry side for the hose, an axial guide segment for guiding the hose in a longitudinal direction thereof, and a compensation segment formed by a housing adjoining said guide segment, said compensation segment enabling a lateral deflection of the supply line, in relation to the longitudinal direction, in said housing across an axial section;
    an abutment for said restoring element disposed at said entry side and surrounding the hose, said abutment being inserted in said guide element or mounted in a fastening clamp block at said entry side; and
    a fastening plate and pipe clips securing said guide element on said fastening plate.

2. The device according to claim 1, wherein said guide element comprises two half-shell elements disposed to swing open, and a snap buckle for closing said half-shell elements.

3. The device according to claim 2, which comprises a hinge joining said half-shell elements.

4. The device according to claim 1, wherein said guide element has an outlet end, and a plurality of supply lines are led individually through an insert installed in an opening of said housing at said outlet end.

5. The device according to claim 1, wherein said housing has a substantially rectangular or U-shaped geometry with an end face subtended between the legs of a U formed by the U-shaped geometry, and said axial guide segment adjoins said end face and the supply line is guided therethrough.

6. The device according to claim 5, wherein said housing is closed except for an opening in an end face to lead through the supply line.

7. The device according to claim 1, wherein said hose is taken further in the longitudinal direction in said compensation segment.

8. The device according to claim 1, wherein said axial guide element has a plurality of guide rods, and the hose is led between said guide rods.

9. The device according to claim 8, which comprises a holding element holding said guide rods equidistant from one another.

10. The device according to claim 9, wherein said holding element forms said abutment for said restoring element.

11. The device according to claim 9, wherein said holding element is slideably fastened to a securing part.

12. The device according to claim 8, wherein said guide rods are slideably mounted at ends thereof on the compensation segment.

13. The device according to claim 8, wherein said compensation segment comprises two hinged half-shell elements, joined together by a hinge element, and wherein one of said guide rods forms a hinge pin.

14. The device according to claim 8, which comprises at least one adapter sleeve disposed around each of said guide rods.

15. The device according to claim 1, wherein said axial guide segment is a closed, round pipe segment.

16. An industrial robot, comprising the hose guiding device according to claim 1.

17. A device for guiding a hose of an industrial robot, the hose having at least one supply line, the device comprising:
    a restoring element;
    a guide element movably guiding the hose against a restoring force of said restoring element;
    said guide element being configured to swing open, and said guide element having an entry side for the hose, an axial guide segment for guiding the hose in a longitudinal direction thereof, and a compensation segment formed by a housing adjoining said guide segment, said compensation segment enabling a lateral deflection of the supply line, in relation to the longitudinal direction, in said housing across an axial section;
    an abutment for said restoring element disposed at said entry side and surrounding the hose, said abutment being inserted in said guide element or mounted in a fastening clamp block at said entry side;
    wherein said axial guide segment has a plurality of guide rods, and the hose is led between said guide rods; and
    a holding element slideably fastened to a securing part, said holding element holding said guide rods equidistant from one another 18. A device for guiding a hose of an industrial robot, the hose having at least one supply line, the device comprising:
    a restoring element;
    a guide element movably guiding the hose against a restoring force of said restoring element;
    said guide element being configured to swing open, and said guide element having an entry side for the hose, an axial guide segment for guiding the hose in a longitudinal direction thereof, and a compensation segment formed by a housing adjoining said guide segment, said compensation segment enabling a lateral deflection of the supply line, in relation to the longitudinal direction, in said housing across an axial section; and
    an abutment for said restoring element disposed at said entry side and surrounding the hose, said abutment being inserted in said guide element or mounted in a fastening clamp block at said entry side;
    wherein said axial guide segment has a plurality of guide rods with ends slidably mounted on said compensation segment, and the hose is led between said guide rods.

19. A device for guiding a hose of an industrial robot, the hose having at least one supply line, the device comprising:
- a restoring element;
- a guide element movably guiding the hose against a restoring force of said restoring element;
- said guide element being configured to swing open, and said guide element having an entry side for the hose, an axial guide segment for guiding the hose in a longitudinal direction thereof, and a compensation segment formed by a housing adjoining said guide segment, said compensation segment enabling a lateral deflection of the supply line, in relation to the longitudinal direction, in said housing across an axial section; and
- an abutment for said restoring element disposed at said entry side and surrounding the hose, said abutment being inserted in said guide element or mounted in a fastening clamp block at said entry side;
- wherein said axial guide segment has a plurality of guide rods, and the hose is led between said guide rods; and
- wherein said compensation segment includes two hinged half-shell elements, joined together by a hinge element, and wherein one of said guide rods forms a hinge pin.

20. A device for guiding a hose of an industrial robot, the hose having at least one supply line, the device comprising:
- a restoring element;
- a guide element movably guiding the hose against a restoring force of said restoring element;
- said guide element being configured to swing open, and said guide element having an entry side for the hose, an axial guide segment for guiding the hose in a longitudinal direction thereof, and a compensation segment formed by a housing adjoining said guide segment, said compensation segment enabling a lateral deflection of the supply line, in relation to the longitudinal direction, in said housing across an axial section; and
- an abutment for said restoring element disposed at said entry side and surrounding the hose, said abutment being inserted in said guide element or mounted in a fastening clamp block at said entry side;
- wherein said axial guide segment has a plurality of guide rods, and the hose is led between said guide rods, and wherein at least one adapter sleeve is disposed around each of said guide rods.

* * * * *